United States Patent [19]

Bradford

[11] Patent Number: 4,598,280
[45] Date of Patent: Jul. 1, 1986

[54] ELECTRIC CHIP DETECTOR

[75] Inventor: Michael P. Bradford, Orange, Conn.

[73] Assignee: The United States of America as represented by the Secretary of the Army, Alexandria, Va.

[21] Appl. No.: 642,302

[22] Filed: Aug. 20, 1984

[51] Int. Cl.$^4$ .................. G01R 27/02; G01R 33/12; G01N 15/06
[52] U.S. Cl. .................... 340/631; 324/65 R
[58] Field of Search ............. 200/61.09; 335/305; 340/627, 631; 324/65 R

[56] References Cited

U.S. PATENT DOCUMENTS

| | | | |
|---|---|---|---|
| 3,259,891 | 7/1966 | Coulter | 340/627 |
| 3,553,672 | 1/1971 | Smith | 340/627 |
| 4,070,660 | 1/1978 | Tauber | 340/631 |
| 4,219,805 | 8/1980 | Magee | 340/631 |
| 4,302,754 | 11/1981 | Magee | 340/627 |
| 4,467,637 | 8/1984 | Rumberger | 340/631 |
| 4,468,954 | 9/1984 | Lanctot | 340/627 |

FOREIGN PATENT DOCUMENTS 2091819  8/1982  United Kingdom ............... 340/631

*Primary Examiner*—Reinhard J. Eisenzopf
*Assistant Examiner*—Jose M. Solis
*Attorney, Agent, or Firm*—William J. Sheehan; Norman L. Wilson, Jr.; Anthony T. Lane

[57] ABSTRACT

Frequently, particularly in the case of old machines such as engines, transmissions, and gear boxes, particles, or "chips", are produced as the internal parts wear out. When these chips are present they indicate equipment damage and must be removed since they can cause additional damage to the equipment. For over a decade such electric chip detectors have been installed in helicopter transmissions and engines, as well as in propulsion and drive systems of many military fixed wing aircraft. Detectors usually have a pair of permanently magnetized electrodes that are insulated from each other and positioned to form a magnetic field in the small gap therebetween. One of the underlying problems of monitoring wear particles is that detectors can be triggered by an accumulation of metallic dust, causing a false chip detection warning. The wear particle detector system herein, of the type having a pair of electrically actuated electrodes, is constructed to discriminate between harmless dust and harmful chips while monitoring the rate of wear particle accumulation as a machine runs.

3 Claims, 3 Drawing Figures

ELECTRIC CHIP DETECTOR

BACKGROUND OF THE INVENTION

During the normal sliding or rolling of one metal part against another, tiny metallic wear particles are produced in various sizes and shapes. Where the metal parts are lubricated by oil or some other hydraulic fluid the particles produced due to wear are either suspended in the lubricant, forming a colloid that can be tolerated until the concentration of wear particles become too large, or transported through the system until captured in a filter. Frequently, particularly in the case of old machines such as engines, transmissions, and gear boxes, larger particles, termed "chips", are produced as the internal parts wear out. When these chips are present they indicate equipment damage and must be removed since they can cause additional damage to the equipment.

When it is necessary to determine the presence of wear particles in machine lubricants, wear particle detectors are employed. For over a decade such electric chip detectors have been installed in helicopter transmissions and engines, as well as in propulsion and drive systems of many military fixed wing aircraft. Since the metallic parts are composed of steel or alloys of steel, the detectors usually contain a magnet that attracts the ferrous debris shed into the lube system by failing components. In detail, detectors usually have a pair of permanently magnetized electrodes that are insulated from each other and positioned to form a magnetic field in the small gap therebetween. One electrode is usually electrically grounded and the other electrode is connected to an electrical warning or fuzz burn-off circuit, one of which is a capacitance circuit described in U.S. Pat. No. 4,070,660. Such circuits operate by passing a small current through the chip or metallic debris that collect and eventually bridges the gap between the two electrodes.

One of the underlying problems of monitoring wear particles is that one cannot see the wearing surfaces, and the existing detectors do not distinguish between the larger harmful particles or chips and the accumulations of harmless minute particles such metal dusts called fuzz. Consequently, detectors can be triggered by an accumulation of metallic dust, causing a false chip detection warning. When such a warning signal is received the equipment must be shut-down and inspected to determine the cause of the signal. In the case of a helicopter gear box the false chip indication causes a mission to be aborted by the immediately required landing. Some improved systems are adapted to burnoff a certain class of metallic debris (e.g., long hair-like strands) to reduce the occurence of false warnings. However, such systems accommodate only limited types of debris and, as set forth in U.S. Pat. No. 4,070,660 destroy fuzz by the discharging of a capacitor through the fuzz in order to melt it. If the capacitor does not melt the debris, thus opening the bridge across the gap, then the capacitor cannot recharge and a signal is activated indicating the presence of a chip. This detector has the disadvantage that the debris must have a suitable geometry to be able to suddenly apply a low impedance across the chip detector gap. Long hair-like strands are examples because they can be captured by the magnetic field and suddenly bridge the two electrodes. Then a full capacitor charge can be discharged through the strand to melt it away. Agglomerations of small particles tend to slowly reduce the gap resistance and weaken the capacitor charge; often this class of debris does not burnoff and results in false warnings. In addition, a separate burnoff circuit is incorporated in each wear particle detector of U.S. Pat. No. 4,070,660. This is undesirable where as many as seven detectors may be located on a single helicopter. It would be more desirable to have a single circuit for all seven detectors. It would be even more advantageous to have a system sensitive to the size of the particle captured by the detector, and that indicates to the crew when the detector is becoming clogged with small debris. A wear particle detecting system is provided herein which accomplishes all of these advantages.

SUMMARY OF THE INVENTION

In accordance with the practice of this invention, a wear particle detector system of the type having a pair of electrically actuated electrodes positioned to form a magnetic field therebetween, disposed in a lubricant to attract and collect wear particles, is constructed to monitor the rate of wear particle accumulation as a machine runs. This monitoring is accomplished continuously by input circuit means for incrementally determining wear particle detector resistance values $R_1, R_2 \ldots R_n$ as the machine runs, where n is the number of resistance values determined. Means for storing these resistance values are provided along with means for converting the stored resistance values to digital input data.

Construction of an analog system for monitoring is accomplished by a differentiating circuit and an integrating circuit connected in parallel to the particle detector to discriminate between harmless particles suspended in the lubricant and actual harmful chips. To detect harmful chips the differentiation circuit performs a mathematical differentiation according to the equation $V_o = 1/k \times dR_n/dt$, where $V_o$ is the detector output, k is a constant controlled by transistor gain, and $R_n$ is the chip sensor resistance. The integrating circuit generates responses to the slow and cumulative build-up of harmless captured particles.

Zener diode means are coupled to the differentiating circuit to determine the threshold k1 and Zener diode means are also coupled to the integrating circuit to set the threshold value k2 allowing a predetermined concentration of captured particles on the detector.

DETAILED DESCRIPTION OF THE INVENTION

Wear at the interface between moving parts is a normal characteristic of machine operation. The kind and the rate of wear depend on the machine. Lubrication is provided between moving surfaces to minimize the wear, but even during lubricated operation minute wear particles enter the lubricating oil. The particles range in size from several tens-of-micrometers to a small fraction of micrometer for example, 20 mm. Some particles remain in the oil as stable colloids and do not settle out if the oil is withdrawn. Also present are millions of other particles which are not the result of wear. They are introduced from the air or from other contaminating sources. As the machine ages and its parts wear, the size and production rate of debris increases. Debris particle size then ranges up into the region of several thousands of micrometers.

In the last fifty years, the design of machines has tended to higher and higher powers in a smaller space and machines have been designed so that the operating parts are invisible. This led from the inception to the concept that engines should be taken apart at regular intervals for inspection and replacement of worn parts. However, in the last decade a counter-movement has occurred in which the philosophy is to disassemble the machine as infrequently as possible. Reliability studies have shown conclusively that the probability of failure shortly after placing a reassembled engine in service is much higher than after the engine has been in service for an extended period. Therefore, what is needed is some way to return to the situation whereby the parts can be monitored as the machine runs. This invention provides such monitoring, either digitally or by analog means.

Figure 1:
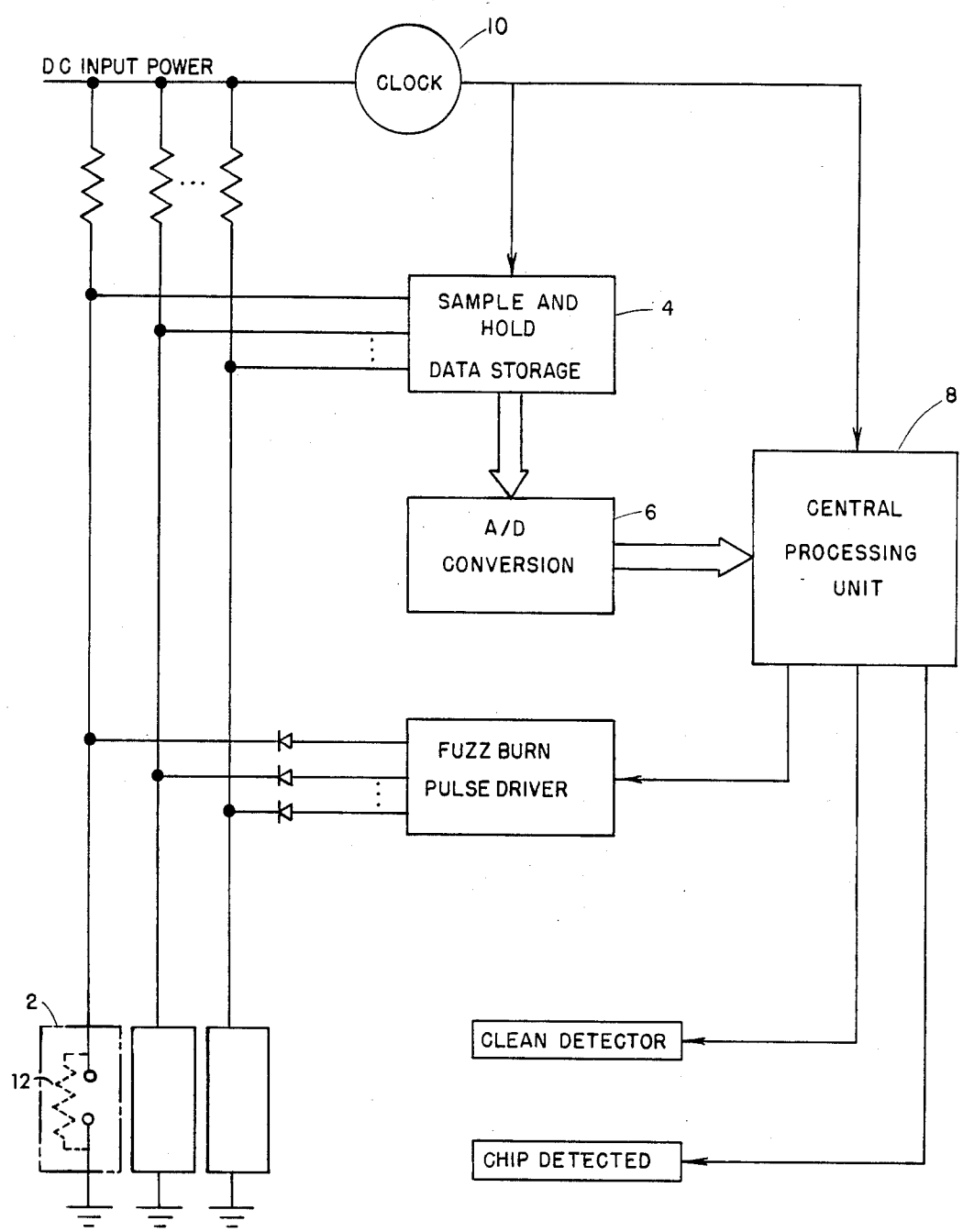
FIG. 1 shows a system for the digital monitoring of wear particle buildup.

Referring first to the digital system, FIG. 1 is a schematic showing a machine-implemented embodiment. The system is adapted for the use of a common fixed-gap chip detector 2 which forms a magnetic field to attract wear particles. The processing apparatus includes a data storage register 4, an analog to digital converter 6 and a central processing unit 8, containing the arithmetic logic circuits, all under the control of the timing circuit or clock 10. The detector signal from detector 2 is encoded by converter 6 and sent to the CPU, which determines the rate of debris contamination. The CPU reads detector resistance by measuring the voltage across the detector's resistance 12, for each clock pulse, e.g. $R_1, R_2, R_3 \ldots R_n, R_{n+1} \ldots$ and the ALU calculates successive resistance rate-of-change values according to the equation $dR_n/dt = (1/\Delta t)(R_{n-1} - R_n)$. When $dR_n/dt$ is greater than a constant k1 and detector resistance 12 is lower than a constant k2 after one fuzz burn pulse, a large wear particle has been detected. When the detector resistance falls below k2 without $dR_n/dt$ exceeding k1, a one-shot pulse is generated to burn-off a possible accumulation of small debris. If the resistance of the detector does not recover to a value above k2, a CLEAN signal is generated. Both flight test experience and laboratory testing have shown that minute metal debris agglomorates slowly on the insulator between a chip detector's magnetized electrodes, and that the debris collection gradually lowers the resistance across the insulator gap. Capture of a chip or long strand of hair-like debris reduces the resistance near instantly to a low value. The value of k1 is selected from data to permit the slow degradation of resistance up to a point without causing a chip signal, and is in the range of −10 to −100 kilohms per second, preferably −40 kilohms/sec. Testing has also shown that minute debris does collect to saturate the detector and produce erroneous chip capture signals. The valve of k2 is selected above that threshold and is in the range of 17 to 23 kilohms, preferably 20 kilohms. These values would need adjustment to accommodate chip detectors having different gap sizes, configurations, and magnetic field characteristics.

If detector $R_n$ values do not return above k2 after the fuzz burn pulse, an output circuit signals that a bona fide chip has been captured. If detector $R_n$ values do return above k2 after the pulse, no output signals are generated at all. Whenever $dR_n/dt$ has not exceeded k1, but $R_n$ has fallen below k2, one fuzz-burn pulse is also generated since it may be possible to burn-off sections of a "dust bridge" that has slowly accumulated. If after the pulse, the detector Rn values do not return above k2, an output circuit signals that the detector needs cleaning but that no chips are present.

Figure 2:
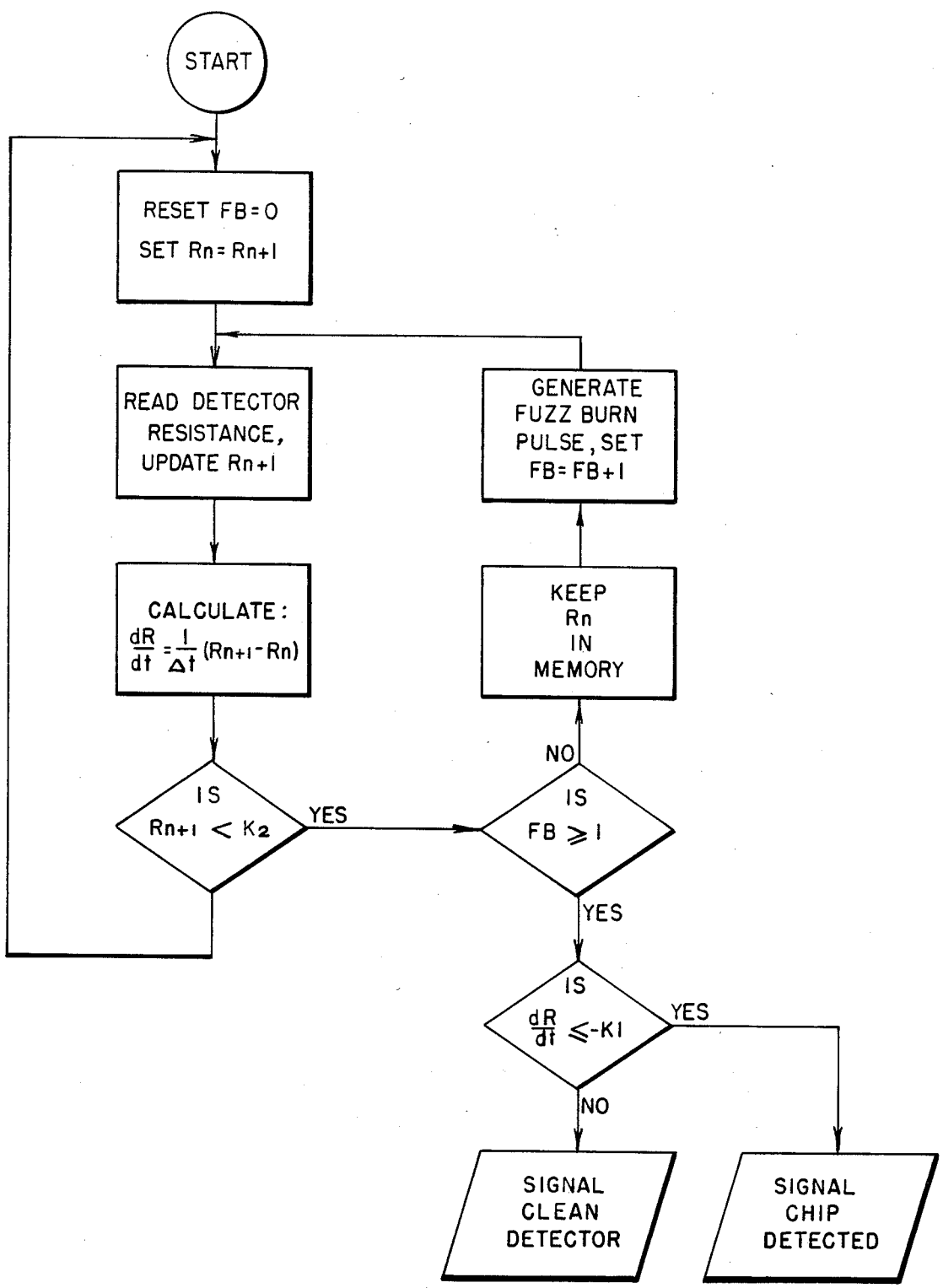
FIG. 2 shows an algorithm representation for the system of FIG. 1.

An algorithm for this system is given in FIG. 2. As set forth therein clean signals are given at detrimental levels of debris build-up that has accumulated gradually, and after one multivibrator fuzz destruction cycle. A chip detector warning is also provided by the algorithm should the detector resistance remain low after a sharp drop in the resistance has occurred and one fuzz destruction cycle has been completed.

A feature of this invention is that it can discriminate between harmless sludge or fuzz and actual chips, and warn the pilot accordingly. This is accomplished by determining the rate of resistance change across the detector face, and signaling either when: slowly accumulating debris is nearly saturating the detector (signal—CLEAN), or when a sharp drop in detector resistance that does not fuzz burn away indicates a chip (signal—CHIP).

Having explained how the rate of resistance change is determined digitally it will now be shown how this can be accomplished by an analog implementation. In this connection reference is made to FIG. 3. Circuit 10 includes essential circuits such as differentiator and buffer 12, filter/threshold circuit 14, and logic/drive circuit 15. Circuit 20 includes integrator and buffer circuitry 22, and fuzz-burn/inhibitor 24.

Figure 3:
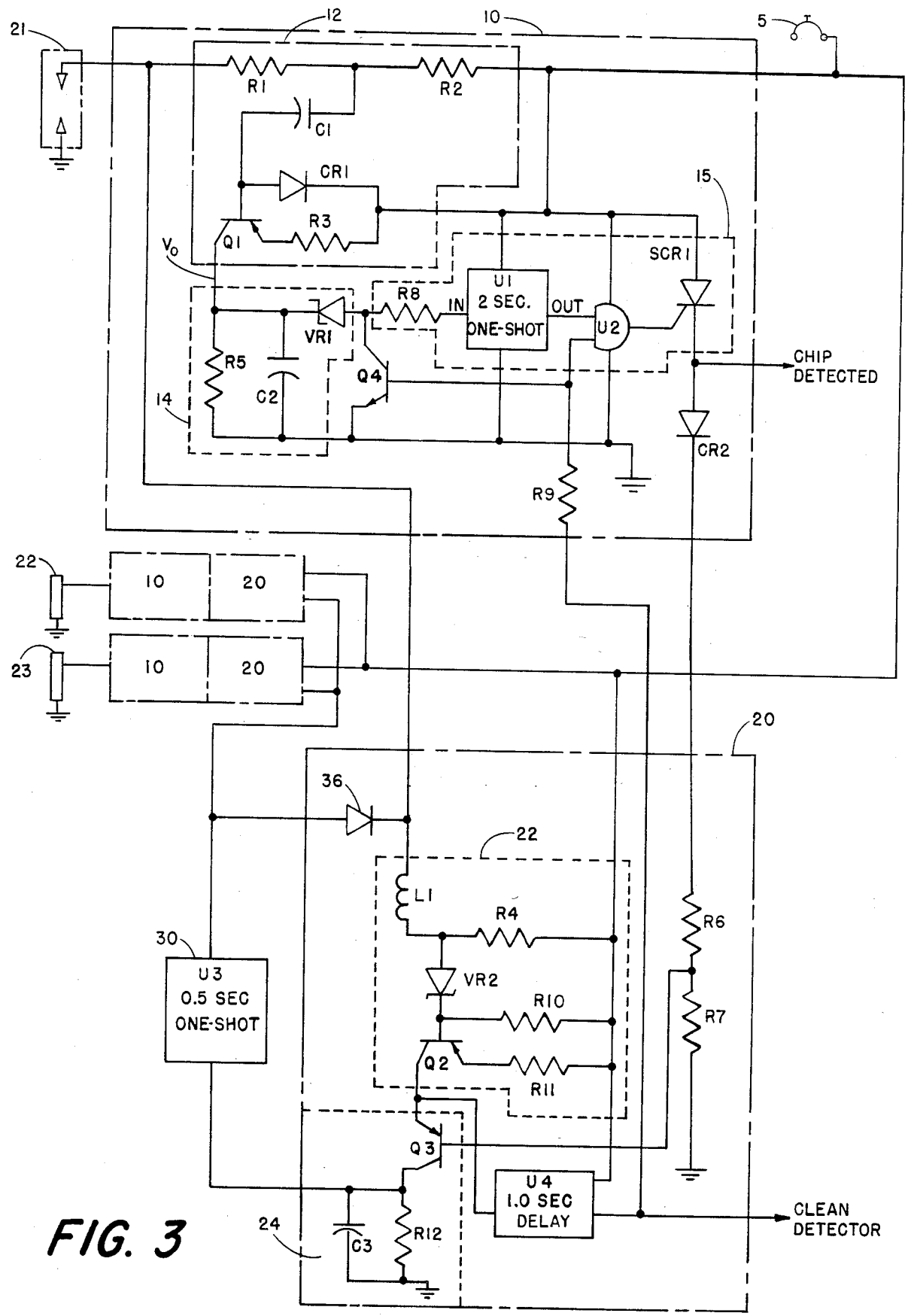
FIG. 3 shows a system for analog monitoring of wear.

It has been pointed out that helicopter transmissions frequently contain a number of detectors, 21, 22, and 23 thru some number N. As can be seen in FIG. 3 whereas a differentiating circuit 10 and integrating circuit 20 is employed for each detector, only one fuzz-burn driver circuit 30 is employed for all detectors.

Referring now to the operation of the system shown in FIG. 3 power from source 5 simultaneously flows through the differentiating circuit of R1, C1, and R2, and through the integrating circuit of R4 and L1 to the chip detectors as resistances of the detectors decrease. Zener diodes suppress false signals. Timing and logic circuits, coupled to the differentiating circuit, activate a chip warning light. This circuiting includes an SCR gate. A second buffer circuit, coupled to the integrating circuit, supplies the power to trigger a one-shot multivibrator. Thereafter, in response to a predetermined concentration of dust particles the second output circuit activates a "clean detector" signal.

Current flow charges capacitor C1. Due to the values of R1, R2, and up to the point that the capacitor is fully charged the sensor circuit responds only to the change in voltage which a chip would create. This follows from the equation for capacitor current:

$$i_c = C \times dv/dt$$

The rate of change of detector resistance causes a rate of change of capacitor voltage, and this consequently causes a proportional current to flow through the capacitor. The larger the rate of change of detector resistance becomes, the larger the capacitor current becomes. R3 and transistor Q1 then convert capacitor current into an output voltage $V_o$ that follows the relationship: $V_o = 1/k\, dR/dt$ where k is a constant between 1,000 and 10,000.

Filter and threshold circuit 14 is an interface circuit that suppress transients and establishes the value of k1. Should $V_o$ be sufficiently large after filtering by R5 and C2 to overcome the reverse conduction threshold of Zener diode VR1, then the one-shot timer U1 of circuit 15 is triggered. The output of the timer activates one input of the warning light AND gate U2 for a period of 2.0 seconds. The other input to the U2 AND gate is activated by circuit 20 only if the steady state detector resistance falls below threshold k2 after one fuzz-burn pulse. Should that occur, the AND gate U2 output triggers first output means SCR1 to latch the CHIP DETECTED signal to the crew. Should the drop in absolute detector resistance not have been sufficient or maintained long enough to trigger circuit 20 (or in other words detector resistance is not less than k2 steady state) then the 2.0 second timer would have reached its end point and deactivated AND gate U2 without ever having triggered SCR1 or the CHIP DETECTED output.

Integrating circuit 20 is sensitive to accumulation of metallic dust. When the dust has lowered a detector's Resistance to a level dependent on VR2, Q2 then conducts. The Q3 inhibit feature is normally disabled, allowing power to charge C3 and trigger the one-shot cleaning device for all the detectors. Diode 36 is in each cleaning circuit to allow cleaning of all the chip sensors of a system simultaneously from a single power source. The actuation point of the clean signal lamp can be calibrated to allow for manual detector cleaning at scheduled maintenance intervals. This technique avoids false "chip detected" warnings since the chip sensing circuitry is still operable even though the detector resistance is slightly degraded. The output of Q2 is fed to AND gate U2 so that if the detector resistance is low after one fuzz burn cycle and dR/dt has exceeded k1, the AND gate would trigger SCR1. Further, the output of Q2 is fed to Q4 in order to inhibit the CHIP DETECTED circuitry once the CLEAN DETECTOR warning has been activated.

In still another form of the invention a pulse modulated cleaning circuit that continuously cleans the detectors can replace the dust sensing circuit. Such modifications are deemed to be within the scope of this invention.

What is claimed is:

1. A data circuit for wear particle detectors of the type having a pair of electrically actuated electrodes disposed in lubricant to attract and collect wear particles comprising input circuit means for incrementally determining wear particle detector resistance values $R_1$, $R_2$, $R_3 \ldots R_n$ where n is the number of resistance values determined, means for storing the resistance values, means for converting stored resistance values to digital input data, comprising means for differentiating successive resistance values according to the equation $dR_n/dt = (1/\Delta t)(R_{n+1} - R_n)$, first output circuit means signaling, when $dR_n/dt$ is greater than k1, and $R_n$ is less than k2, that a large wear particle has been detected, means activating a one-shot multivibrator when Rn is equal to or less than k2, and second output circuit means signaling, when $R_n$ is less than k2, that the detector should be cleaned, k1 being a number in the range of $-10$ to $-100$ kilohms per second k2 being a number in the range of 17 to 23 kilohms.

2. The data circuit of claim 1 wherein k1 is $-40$ kilohms per second and k2 is 20 kilohms.

3. A system for monitoring mechanical wear resulting from rolling or sliding one metal part against another in a hydraulic lubricant wherein wear particle detectors of the type having a pair of electrically actuated electrodes positioned to form a magnetic field there between are disposed in the lubricant to attract and collect wear particles comprising at least one such particle detector, a differentiating circuit and an integrating circuit connected in parallel to said particle detector to discriminate between harmless particles or dust suspended in the lubricant in a colloidal manner and actual harmful chips, the differentiating circuit performing mathematical differentiation to detect harmful chips according to the equation $V_0 = 1/k\, dR/dt$, where $V_0$ is the detector output, k is a constant 1,000 and 10,000, and $R_n$ is the chip sensor resistance at a given interval of time, the integrating circuit generating responses to the build-up of harmless suspended particles, diode means coupled to the differentiating circuit to set k1 in the foregoing equation, diode means coupled to the integrating circuit to set a threshold value allowing a predetermined concentration of suspended particles in the lubricant, filter circuits in series with each diode means to suppress false signals, a buffer circuit coupled to the differentiating circuit to activate a chip warning light, said buffer circuit including a SCR gate, buffer circuit coupled to the integrating circuit to actuate a multivibrator and thereafter, in response to a predetermined concentration of dust particles, a clean detector warning device.

* * * * *